US012013529B2

(12) United States Patent
Ronen et al.

(10) Patent No.: US 12,013,529 B2
(45) Date of Patent: Jun. 18, 2024

(54) COLOR CORRECTED BACK REFLECTION IN AR SYSTEMS

(71) Applicant: Lumus Ltd., Ness Ziona (IL)

(72) Inventors: Eitan Ronen, Rechovot (IL); Elad Sharlin, Mishmar David (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 18/303,413

(22) Filed: Apr. 19, 2023

(65) Prior Publication Data
US 2023/0258930 A1    Aug. 17, 2023

Related U.S. Application Data

(63) Continuation of application No. 17/758,612, filed as application No. PCT/IL2021/051326 on Nov. 9, 2021, now Pat. No. 11,668,933.
(Continued)

(51) Int. Cl.
*G02B 27/01* (2006.01)

(52) U.S. Cl.
CPC ........... *G02B 27/01* (2013.01); *G02B 27/017* (2013.01); *G02B 2027/0112* (2013.01); *G02B 27/0172* (2013.01); *G02B 2027/0178* (2013.01)

(58) Field of Classification Search
None
See application file for complete search history.

(56) References Cited

U.S. PATENT DOCUMENTS

| 3,829,197 A | 8/1974 | Thelen |
| 5,430,505 A | 7/1995 | Katz |
(Continued)

FOREIGN PATENT DOCUMENTS

| CN | 106054393 A | 10/2016 |
| CN | 205787362 U | 12/2016 |
(Continued)

OTHER PUBLICATIONS

Gabbard et al., Color Blending in Outdoor Optical See-through AR: The Effect of Real-world Backgrounds on User Interface Color, 2019, ARXIV ID: 1908.09348 (arxiv.org) (Year: 2019).*
(Continued)

*Primary Examiner* — Stephone B Allen
*Assistant Examiner* — Tamara Y. Washington
(74) *Attorney, Agent, or Firm* — Renner, Otto, Boisselle & Sklar, LLP

(57) ABSTRACT

A method of moderating chromaticity of ambient light in an environment reflected back into the environment by a component comprised in a lens of glasses through which a user of views the environment, the method comprising: determining a first set of tristimulus values that characterizes ambient light reflected by the component surface as a function of angle of reflection $\Theta$ in a bounded span of angles of reflection; determining a second set of tristimulus values for angles in the bounded span of angles so that light characterized by the second set of tristimulus values combined with light reflected by the component would be perceived substantially as white light; and providing an optical coating that reflects ambient light from the environment so that the reflected light is substantially characterized by the second set of tristimulus values.

37 Claims, 13 Drawing Sheets

Related U.S. Application Data

(60) Provisional application No. 63/111,148, filed on Nov. 9, 2020.

(56) References Cited

U.S. PATENT DOCUMENTS

| | | | |
|---|---|---|---|
| 5,712,694 A | 1/1998 | Taira | |
| 6,154,321 A | 11/2000 | Melville | |
| 6,231,992 B1 | 5/2001 | Niebauer | |
| 6,239,092 B1 | 5/2001 | Papasso | |
| 6,404,550 B1 | 6/2002 | Yajima | |
| 6,542,307 B2 | 4/2003 | Gleckman | |
| 6,671,100 B1 | 12/2003 | McRuer | |
| 6,829,095 B2 | 12/2004 | Amitai | |
| 6,847,488 B2 | 1/2005 | Travis | |
| 7,576,916 B2 | 8/2009 | Amitai | |
| 7,710,655 B2 | 5/2010 | Freeman et al. | |
| 8,098,439 B2 | 1/2012 | Amitai et al. | |
| 8,187,481 B1 | 5/2012 | Hobbs | |
| 8,665,178 B1 | 3/2014 | Wang | |
| 9,298,592 B2 | 3/2016 | Sofia | |
| 10,133,070 B2 | 11/2018 | Danziger | |
| 10,222,535 B2 | 3/2019 | Remhof | |
| 10,302,835 B2 | 5/2019 | Danziger | |
| 10,437,031 B2 | 10/2019 | Danziger | |
| 10,437,068 B2 | 10/2019 | Weng | |
| 10,481,319 B2 | 11/2019 | Danziger | |
| 10,712,567 B2 | 7/2020 | Georgiou et al. | |
| 10,928,250 B2 | 2/2021 | Oike | |
| 11,378,391 B2 | 7/2022 | Do | |
| 2005/0024849 A1 | 2/2005 | Parker | |
| 2005/0174658 A1 | 8/2005 | Long et al. | |
| 2005/0180687 A1 | 8/2005 | Amitai | |
| 2006/0221448 A1 | 10/2006 | Nivon | |
| 2007/0002191 A1 | 1/2007 | Hashizume et al. | |
| 2007/0097513 A1 | 5/2007 | Amitai | |
| 2007/0171329 A1 | 7/2007 | Freeman | |
| 2008/0151375 A1 | 6/2008 | Lin | |
| 2008/0186448 A1 | 8/2008 | Ishak et al. | |
| 2009/0012241 A1 | 1/2009 | Kozlowski | |
| 2009/0122414 A1 | 5/2009 | Amitai | |
| 2010/0201953 A1 | 8/2010 | Freeman | |
| 2010/0214635 A1 | 8/2010 | Sasaki | |
| 2011/0096566 A1 | 4/2011 | Tsai | |
| 2011/0109880 A1 | 5/2011 | Nummela | |
| 2013/0135749 A1 | 5/2013 | Akutsu | |
| 2013/0208362 A1 | 8/2013 | Bohn | |
| 2013/0250431 A1 | 9/2013 | Robbins et al. | |
| 2014/0019801 A1 | 1/2014 | Sutton | |
| 2015/0131059 A1 | 5/2015 | Fischer et al. | |
| 2015/0182348 A1 | 7/2015 | Siegal | |
| 2015/0289762 A1 | 10/2015 | Popovich | |
| 2016/0007419 A1 | 1/2016 | Lee | |
| 2016/0259167 A1 | 9/2016 | Takagi | |
| 2017/0198974 A1 | 7/2017 | Cerny | |
| 2017/0285346 A1 | 10/2017 | Pan | |
| 2017/0285348 A1 | 10/2017 | Ayres et al. | |
| 2017/0293149 A1 | 10/2017 | Tatsugi | |
| 2017/0353714 A1 | 12/2017 | Poulad | |
| 2018/0210202 A1 | 7/2018 | Danziger | |
| 2018/0275409 A1 | 9/2018 | Gao | |
| 2018/0284443 A1 | 10/2018 | Matsuki | |
| 2018/0321515 A1 | 11/2018 | Cheng et al. | |
| 2019/0227317 A1 | 7/2019 | Trail et al. | |
| 2020/0192089 A1 | 6/2020 | Haddick | |
| 2020/0209667 A1 | 7/2020 | Sharlin | |
| 2020/0278558 A1 | 9/2020 | Yamamoto et al. | |
| 2020/0292733 A1 | 9/2020 | Lee et al. | |
| 2020/0292744 A1 | 9/2020 | Danziger | |
| 2021/0256931 A1 | 8/2021 | Willard | |

FOREIGN PATENT DOCUMENTS

| | | |
|---|---|---|
| JP | H09313843 A | 12/1997 |
| JP | 2012037761 A | 2/2012 |
| JP | 2012058404 A | 3/2012 |
| JP | 2012198263 A | 10/2012 |
| WO | 2006098809 A2 | 9/2006 |
| WO | 2012107152 A1 | 8/2012 |
| WO | 2015012280 A1 | 1/2015 |
| WO | 2021171289 A1 | 9/2021 |
| WO | 2021220267 A1 | 11/2021 |
| WO | 2021245664 A1 | 12/2021 |

OTHER PUBLICATIONS

International Search Report mailed Feb. 18, 2022, in corresponding International Application No. PCT/IL2021/051326.

Mukawa et al., "A full-color eyewear display using planar waveguides with reflection volume holograms," Journal of The Society for Information Display—J Soc Inf Disp., Mar. 17, 20099, 10.1889/JSID17.3.185-187, Mar. 31, 2009, pp. 285-287, 1-27.

* cited by examiner

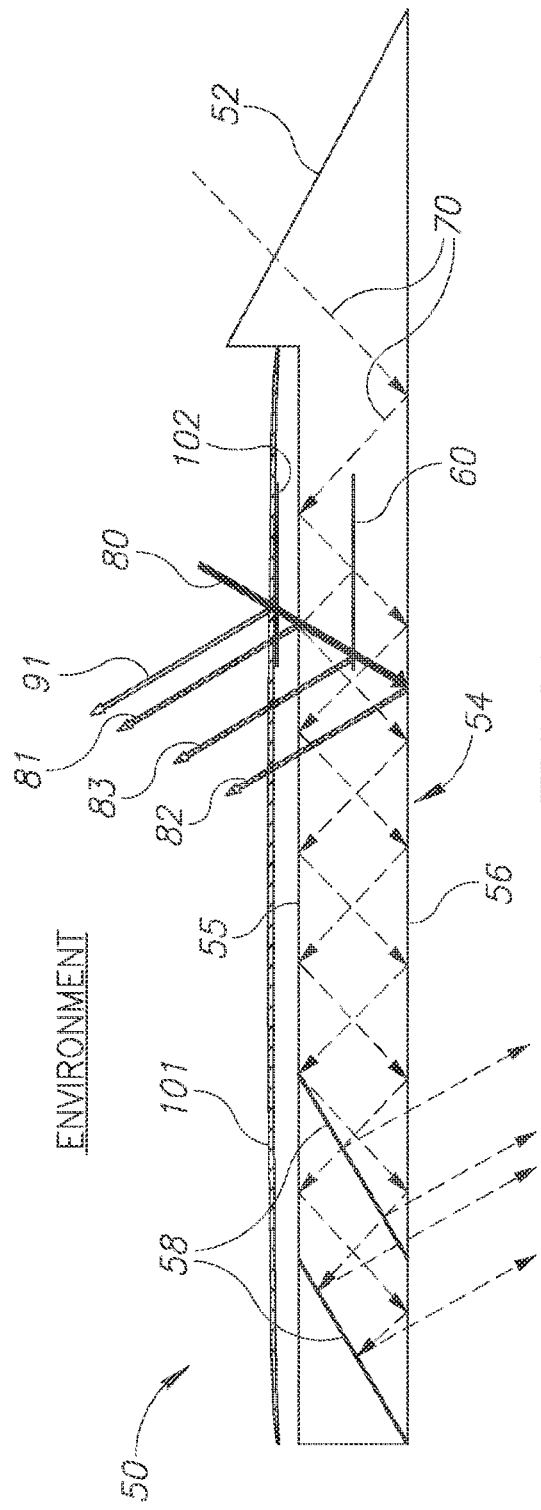
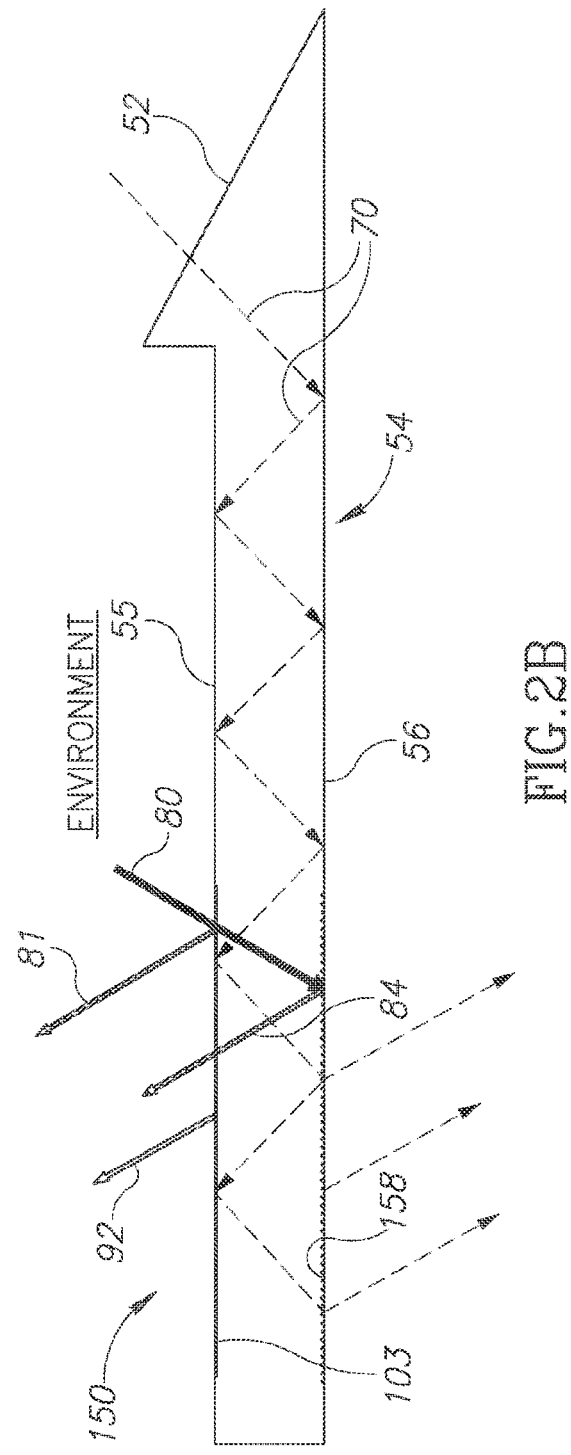

COMMENT
**Assuming that Back-Reflecting Component BR and CCC
are one behind the other with CCC in front, facing the ambient environment then:**

1) Total Back Reflectivity $TBR(\lambda,\theta)_{3Cbr}$ of the pair CCC & BR:

$$TBR(\lambda,\theta)_{3Cbr} = [(R_{3C}+R_{br}+R_{3C}R_{br}(R_{3C}-2)]$$

2) CIE Tristimulus values (e.g. $X(\theta)_{cr} = X(C,\theta)_{3C} \oplus X(\theta)_{br}$) are:

$$X(\theta)_{cr} = \int_\lambda TBR(\lambda,\theta)_{3Cbr}\, \bar{x}(\lambda)d\lambda = \int_\lambda [(R_{3C}+R_{br}+R_{3C}R_{br}(R_{3C}-2)]\, \bar{x}(\lambda)d\lambda$$
$$= X(\theta)_{3C} + X(\theta)_{br} + \int_\lambda R_{3C}R_{br}(R_{3C}-2)]\, \bar{x}(\lambda)d\lambda;\text{ and similarly}$$
$$Y(\theta)_{cr} = Y(\theta)_{3C} + Y(\theta)_{br} + \int_\lambda R_{3C}R_{br}(R_{3C}-2)]\, \bar{y}(\lambda)d\lambda;\text{ and}$$
$$Z(\theta)_{cr} = Z(\theta)_{3C} + Z(\theta)_{br} + \int_\lambda R_{3C}R_{br}(R_{3C}-2)]\, \bar{z}(\lambda)d\lambda;$$

where $\bar{x}(\lambda)$, $\bar{y}(\lambda)$, and $\bar{z}(\lambda)$ are the CIE matching functions.

3) Note:
For sufficiently small values of $R_{3C}$ and $R_{br}$ the integrals in the expressions for $X(\theta)_{cr}$, $Y(\theta)_{cr}$, and $Z(\theta)_{cr}$, above may be ignored and the expressions reduce to:

$$X(\theta)_{cr} = X(\theta)_{3C} + X(\theta)_{br}$$
$$Y(\theta)_{cr} = Y(\theta)_{3C} + Y(\theta)_{br};\text{ and}$$
$$Z(\theta)_{cr} = Z(\theta)_{3C} + Z(\theta)_{br}.$$

FIG 3C

| EXPERIMENTAL VALUES FOR PROCEDURE 300 | X | Y | Z |
|---|---|---|---|
| BR Tristimulus in Correction Angle Span 0°-25° | 8.079 | 7.727 | 5.715 |
| MAX | 8.079 | | |
| ΔX, ΔY, ΔZ, | 0.000 | 0.353 | 2.365 |
| Chromaticity Offset Constant C | 6.630 | | |
| Chromaticity Correction Coating ΔX+C, ΔY+C, ΔZ+C) | 6.630 | 6.983 | 8.995 |
| Chromaticity Correction Coating for Produced CCC in Span 0°-25° | 6.631 | 7.050 | 9.238 |
| CIE Tristimulus Values X, Y, Z for Corrected, Joint Reflectivity in Correction Angle Span 0°-25° | 14.711 | 14.776 | 14.953 |
| Corresponding CIE Color Space x,y,z for Corrected, Joint Reflectivity in Correction Angle Span 0°-25° | 0.331 | 0.332 | 0.336 |

FIG 5E

COLOR CORRECTED BACK REFLECTION IN AR SYSTEMS

RELATED APPLICATIONS

The present application is a continuation of U.S. application Ser. No. 17/758,612, filed Jul. 11, 2022 which claims priority to International Application No. PCT/IL2021/051326, filed Nov. 9, 2021 which claims the benefit of U.S. Provisional Application 63/111,148 filed on Nov. 9, 2020, the disclosures of which are incorporated herein by reference in their entirety.

FIELD

Embodiments of the disclosure relate to providing augmented reality (AR) and mixed reality (MR) display systems, hereinafter generically referred to as AR systems.

BACKGROUND

AR display systems deliver "virtual images", to the eye of a user that the AR system superposes on "real images" of scenes in the user's real ambient environment that the user sees in his or her field of view (FOV). The system comprises a display engine, such as a liquid crystal on silicon (LCOS) or organic light emitting diode (OLED), and an image delivery system. A controller controls the display engine to generate small copies of the virtual images to be displayed, which the image delivery system propagates to an eye motion box (EMB) for viewing by the user's eye. The image delivery system comprises at least one light guiding optical element (LOE) that receives the virtual images that the display engine generates at a relatively small input aperture of the LOE. The LOE input aperture and the virtual image typically having characteristic dimensions less than or equal to about 5 mm. The LOE propagates the virtual images to an output aperture of the LOE near to the user's eye through which the virtual images leave the LOE and are directed into the EMB. The at least one LOE is at least partially transparent to ambient light to enable the user to view the user ambient environment.

The LOE typically comprises various reflecting, transmitting, and/or diffracting optical components for receiving, propagating, and delivering the virtual images from the display engine to the eye box. For many configurations of AR systems, the components reflect some of the light incident on the LOE components from the user ambient environment back into the environment. Whereas the incident ambient light is generally white light, the back reflected light may be, and often is strongly chromatic and disturbing to persons interacting with the user.

SUMMARY

An aspect of an embodiment of the disclosure relates to providing an AR system for which light back reflected from a user ambient environment appears substantially white.

In an embodiment the AR system comprises at least one optical coating on an external surface of the LOE that functions as a chromaticity corrective coating (CCC or 3C) for at least one component, also referred to as a "back-reflecting component", of the LOE that reflects light into the user ambient environment as light that is not perceived as white light. The CCC is designed having a reflectivity for ambient light incident on the CCC from the environment that complements reflectivity of the at least one back-reflecting component to provide a corrected reflectivity for the AR system that is a function of the reflectivities of both the CCC and the back-reflecting component. As a result of the corrected reflectivity provided by the CCC, the AR system reflects incident ambient light back into the environment as light that appears to be substantially white light for angles of reflectance in a span, referred to as a correction span, of angles relative to a normal of the LOE. Optionally, the CCC has a spatial extent on a surface on which the CCC is formed that substantially matches a spatial extent of a projection of the back-reflecting component on the surface. A region of an external surface of the LOE from which chromatic back-reflected light leaves the LOE and enters the ambient environment of a user may be referred to as a "chromaticity blemish".

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure may be labeled with a same label in multiple figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIGS. 2A-2C schematically show LOEs of image delivery systems comprising back-reflecting components that generate chromatic back-reflectance, and CCCs that operate to moderate chromaticity of the back-reflectance, in accordance with embodiments of the disclosure;

FIGS. 5A-5E show graphs of data encountered in actual configuring and generating a CCC, in accordance with an embodiment of the disclosure.

DETAILED DESCRIPTION

In the discussion, unless otherwise stated, adjectives such as "substantially" and "about" modifying a condition or relationship characteristic of a feature or features of an embodiment of the disclosure are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to are by way of nonlimiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1A:
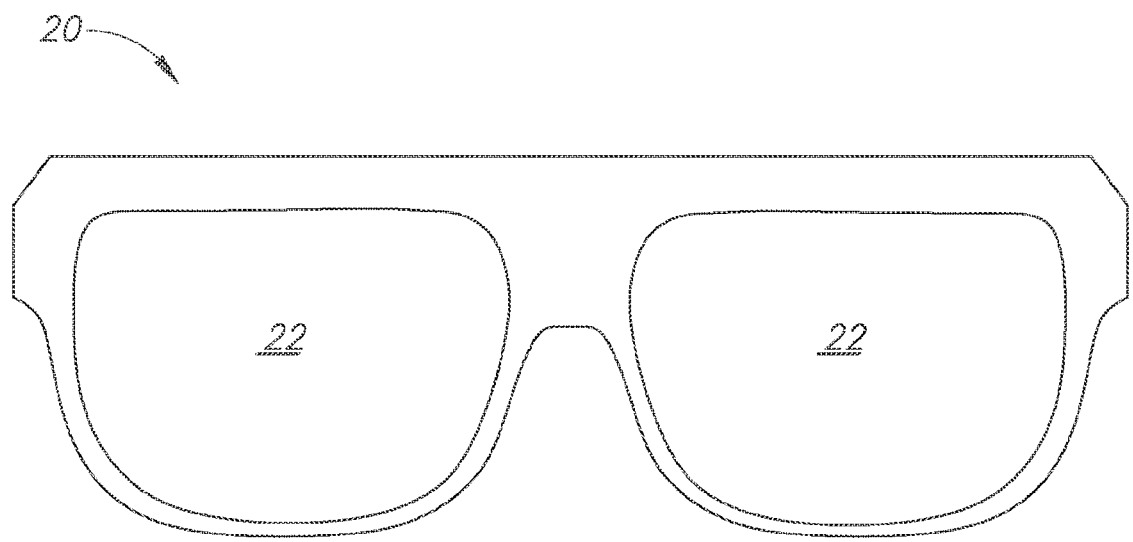
FIG. 1A schematically shows a front view of glasses that are not exhibiting chromaticity blemishes.
Figure 1B:
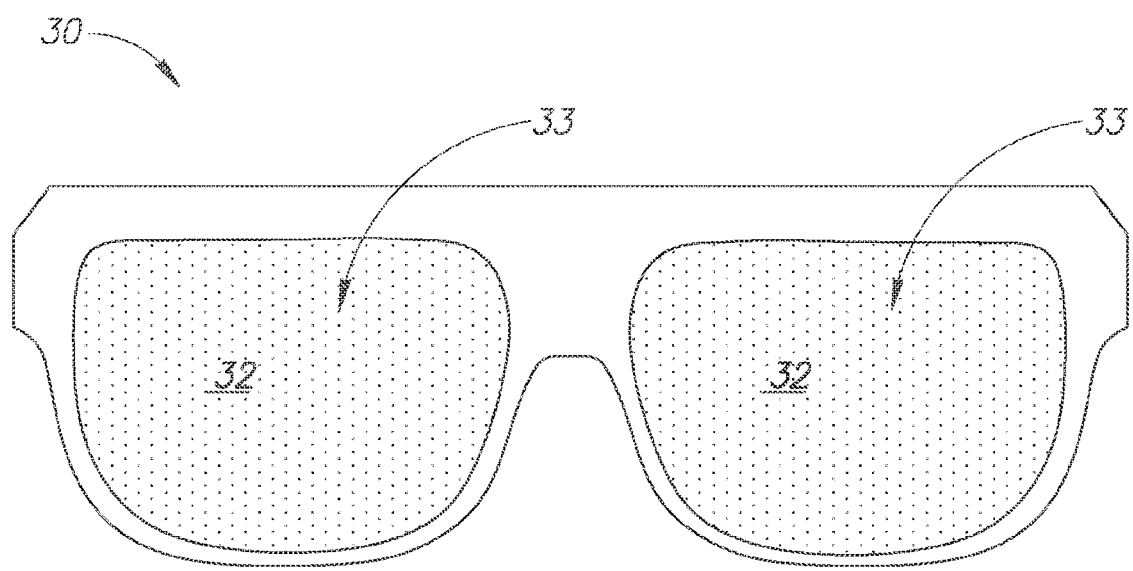
FIG. 1B schematically shows a front view of prior art AR glasses exhibiting chromatic blemishes that substantially cover all the surface area of lenses of the glasses and are characterized by chromatic reflectance from a TIR surface of an LOE comprised in an image delivery system of the glasses.
Figure 1C:
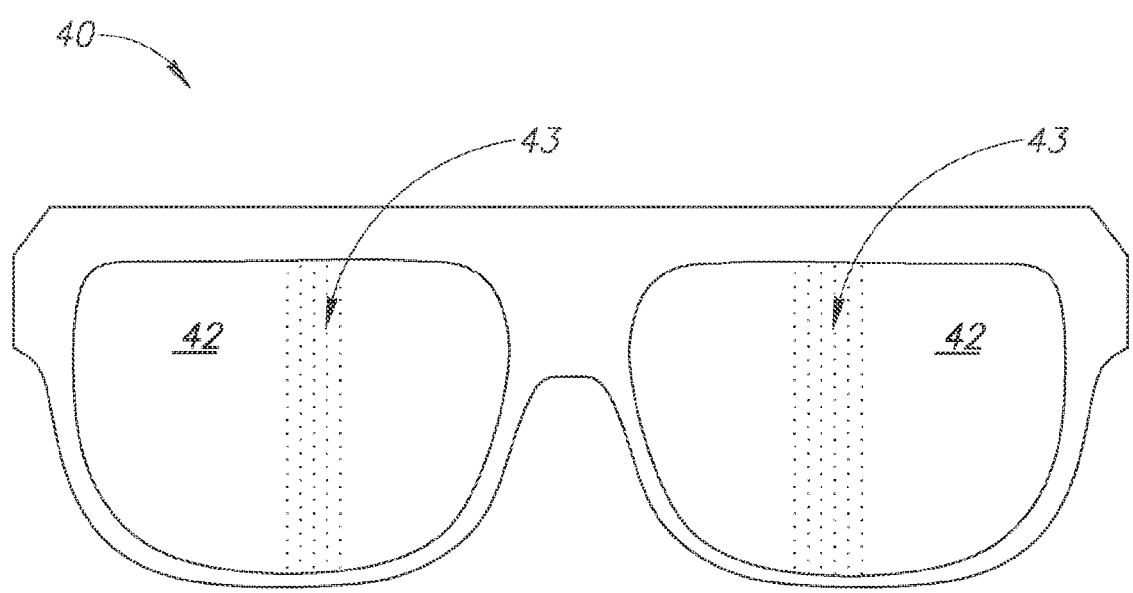
FIG. 1C schematically shows a front view of prior art AR glasses exhibiting a relatively narrow chromatic blemish on each of the lenses of the AR glasses that is characterized by chromatic reflectance from a relatively small back-reflecting component comprised in an image delivery system of the glasses.
Figure 1D:
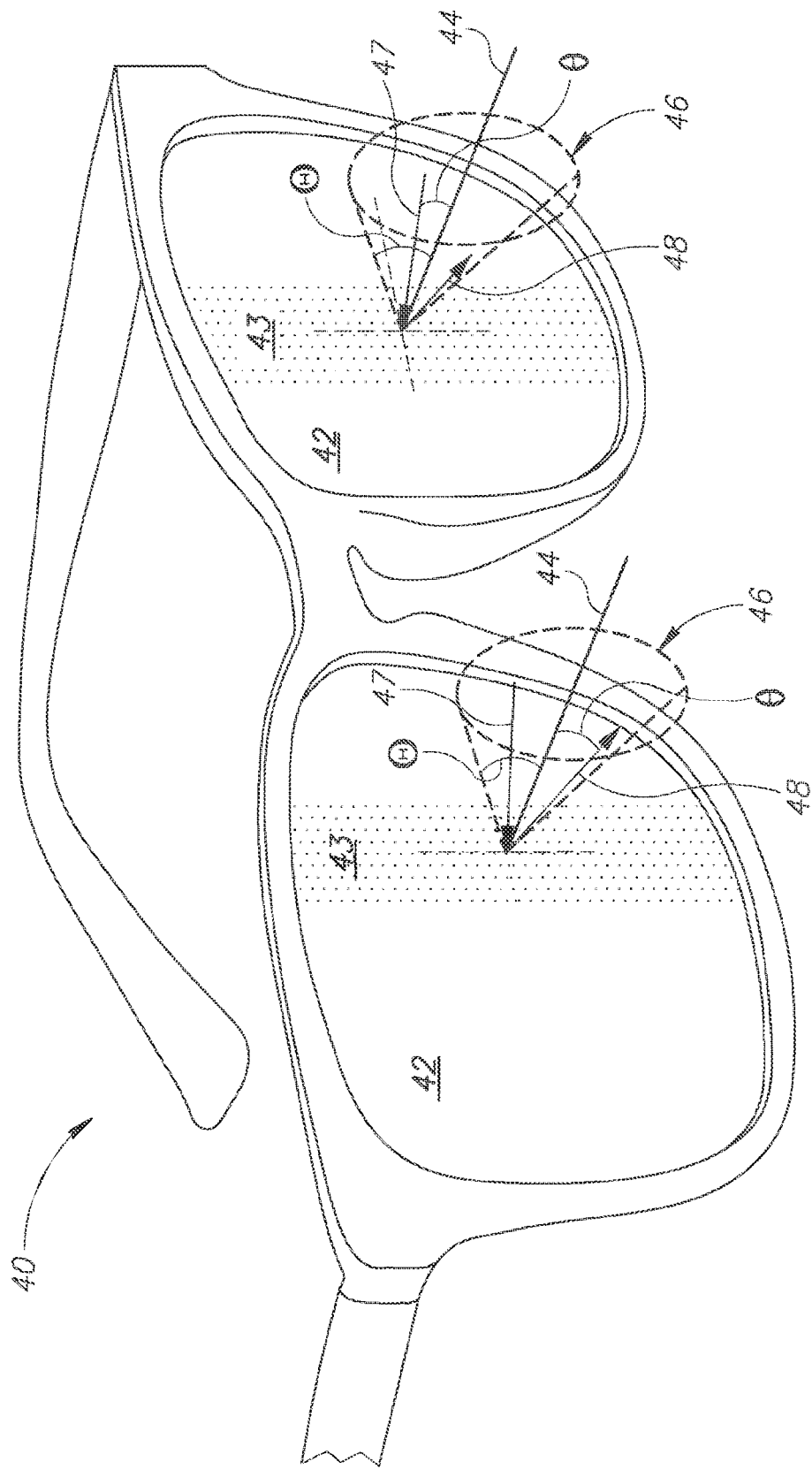
FIG. 1D schematically shows a perspective view of the AR glasses shown in FIG. 1C and a correction span of angles for the blemishes on the AR lenses of the glasses.
Figure 2C:
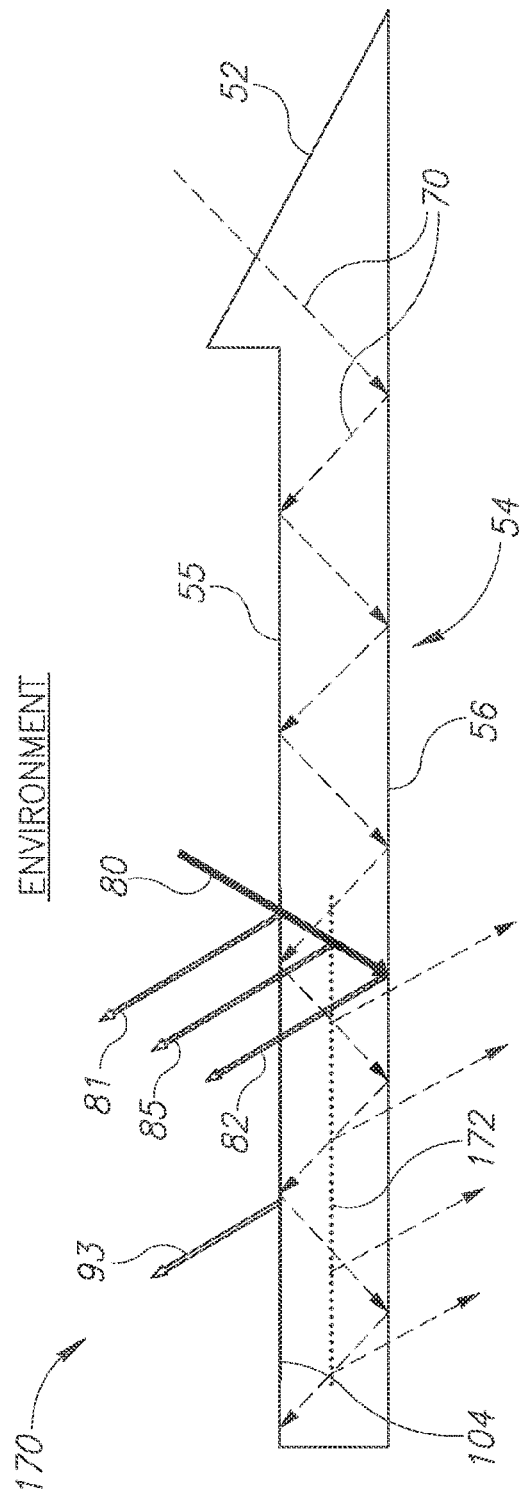

In the description that follows FIG. 1A schematically show a front view of glasses that do not exhibit chromaticity blemishes and FIGS. 1B-1D show AR glasses for which back reflectance chromaticity blemishes are generated by components of an LOE comprised in the glasses. FIGS. 2A-2C schematically show cross sections of LOEs comprising back-reflecting components that might be responsible for generating chromaticity blemishes shown in FIG. 1B-1D. FIGS. 3A-3B and 4A-4B show flow diagrams of methods that may advantageously be implemented to configure CCCs to moderate chromaticity of undesirable back-reflectance that generates chromaticity blemishes in AR glasses, in accordance with an embodiment of the disclosure.

FIG. 1A schematically shows a front view of a pair of optionally ordinary optical glasses 20 having lenses 22 that appear clear. Ambient light from an ambient environment of a user wearing the glasses that is incident on the lenses and is reflected back into the environment does not exhibit chromaticity disturbing to another person. FIG. 1B schematically shows a pair of AR glasses 30 having lenses 32 comprising LOEs (not shown in FIG. 1B) having a relatively large back-reflecting component that reflects ambient light from a user environment to generate a relatively large chromaticity blemish represented by speckling 33 that covers substantially all the surface of the lenses. FIG. 1C schematically shows AR glasses 40 exhibiting spatially restricted, optionally band shaped chromaticity blemishes 43 that may be generated by a relatively small back-reflecting component of an LOE in lenses 42 of glasses. FIG. 1D schematically illustrates a perspective view of AR glasses 40 shown in FIG. 1C and shows a normal 44 to each lens 42 for a region of chromaticity blemish 43 on the lens. A cone 46 having a cone half angle $\Theta$ and cone axis coincident with normal 44 represents a correction span of angles for the blemish. Ambient light rays incident on lenses 42 and light rays back reflected from the incident ambient light rays by the back-reflecting component of the LOE that generates blemish 43 propagate along directions that lie within cone 46 and make an angle $\theta$ relative to normal 44 that satisfies $0° \leq \theta \leq \Theta$. By way of a numerical example, a correction span of angle for which it may be advantageous to provide AR glasses with a chromaticity corrective coating CCC may be characterized by an angle $\theta$ between about 20° and 30° inside material of the lens and a corresponding angle between about 32° and 40° in air.

FIG. 2A schematically shows an LOE 50 comprising back-reflecting components that may generate chromaticity blemishes, such as blemishes 33 and 43 shown in FIGS. 1B and 1C, on a lens of AR glasses comprising the LOE.

LOE 50 comprises an input prism 52 for receiving light represented by dashed arrow lines 70 from an image provided by an image engine (not shown) and a waveguide 54 optically coupled to the input prism. Waveguide 54 propagates light received by the input prism along a length of the waveguide by repeated reflection back and forth between total internally reflecting (TIR) front and back surfaces 55 and 56 respectively to reach and be incident on output facets 58. Output facets 58 reflect light propagated to the output facets out from the waveguide and into an eye motion box (not shown) of the AR glasses. Front TIR surface 55 is assumed to face towards an ambient environment of a user (not shown) wearing the glasses, and back TIR surface 56 is assumed to face the user. Location of the ambient environment is indicated in the figure by the underlined word "environment". LOE 50 may also comprise an embedded mixer 60 that extends a relatively short distance along the length of waveguide 54. The mixer splits light rays received from input prism 52 that are incident on the mixer to increase a number of beams that are repeatedly reflected back and forth by and between TIR surfaces 55 and 56 to propagate along the waveguide. The increased number of beams operates to aid in preventing lacunae in virtual images that facets 58 direct to the eye motion box.

Ambient light from the environment that is incident on LOE 50 within a correction span of angles, such as correction span 46 shown in FIG. 1D, is schematically represented by a bold block arrow 80. Front and back TIR surfaces 55 and 56 and mixer 60 reflect some of the light in incident light ray 80 back into the environment as back-reflected light represented by light rays 81, 82 and 83 respectively that contribute to generating a chromaticity blemish on an AR lens (not shown) comprising LOE 50.

Front and back TIR surfaces 55 and 56 are relatively large surfaces, and light 81 and 82 reflected by the surfaces contribute to generating on the AR lens comprising LOE 50 a relatively large chromaticity blemish, such as blemish 33 on AR lens 32 of glasses 30 (FIG. 1B). In accordance with an embodiment of the disclosure at least one CCC may be configured and provided for the AR lens comprising LOE 50 to moderate chromaticity of light 81 and 82 reflected by TIR surfaces 55 and 56 that generate the relatively large chromaticity blemish. In an embodiment, the at least one CCC is configured having a reflectivity for ambient light 80 that complements the reflectivities of TIR surfaces 55 and 54 so that a sum of light from the ambient light that is reflected by the at least one CCC, front TIR surface 55, and back TIR surface 56 is substantially perceived as white light.

In an embodiment the at least one CCC may be formed on at least one or any combination of more than one of TIR surface 55, 56 of LOE 50, or on an external surface of the AR lens comprising the LOE. By way of example, as shown in FIG. 2A the CCC may comprise a relatively large CCC 101 formed on front TIR surface 55. An arrow 91 represents light reflected by CCC 101 into the environment from ambient light that moderates the chromaticity of the chromaticity blemish generated by light back reflected by TIR surfaces 55, 56.

Mixer 60 on the other hand is comparatively small, and light represented by light ray 83 that is back-reflected by the mixer from incident light ray 80, generates on the AR lens comprising the LOE a relatively small chromaticity blemish, optionally similar to blemish 43 shown on lens 42 of AR glasses 40 (FIGS. 1C and 1D). At least one relatively small CCC which reflects light back into the environment that substantially spatially overlaps light reflected by mixer 60 may be formed to moderate chromaticity of light 83 that contributes to the chromaticity blemish generated by the mixer, in accordance with an embodiment. the at least one CCC may be formed on front TIR surface 55, on, or as a part of, a portion of CCC 101, or on the AR lens comprising LOE 50.

By way of example, in FIG. 2A the at least one CCC contiguous a CCC formed contiguous with CCC 101, optionally on a back side of CCC 101. Arrow 91 in FIG. 2A is understood for convenience of presentation to represent light reflected by CCC 102 that moderates chromaticity of light ray 83 reflected by mixer 60 as well as representing light reflected by CCC 101.

FIG. 2B schematically shows an LOE 150 in which output facets 58 comprised in waveguide 54 of LOE 50 shown in FIG. 2A are replaced by a diffraction grating 158 formed on back TIR surface 56 for directing light propagating in the waveguide out from the waveguide and into an eye motion box. Diffraction grating 158 might reflect light, schematically represented by a reflected light ray 84, from ambient incident light ray 80 back to the user environment and generate a chromaticity blemish on a lens comprising LOE 150. A CCC 103 configured to moderate the blemish in accordance with an embodiment of the disclosure may be formed overlapping a region of front TIR surface 55 through which the back reflected light from grating 158 that contributes to generating the chromaticity blemish exits waveguide 54. Whereas CCC 103 is described as being configured to moderate chromaticity of light reflected by grating 158, in an embodiment the CCC may be configured in addition to simultaneously moderate chromaticity of light back reflected by front and back TIR surfaces 55 and 56. An arrow 92 in FIG. 2B represents light reflected by CCC 103 that moderates chromaticity of light ray 84 reflected by grating 158, and optionally chromaticity of light reflected by front and back TIR surfaces 55 and 56 represented by light ray 81 and 82 (FIG. 2A).

FIG. 2C schematically shows another LOE 170 comprising an internal holographic grating 172 for directing light propagating in the waveguide out from the waveguide and into an eye motion box. Holographic grating 172 may reflect light represented by a light ray 85 from ambient light 80 incident on the grating that contributes to a chromaticity blemish, such as chromaticity blemish 43 on an AR lens (not shown), comprising the grating. In accordance with an embodiment of the invention a CCC 104 that moderates the blemish may be formed on front TIR surface 55 and reflect light that moderates chromaticity of back-reflected light 85, and optionally of light back-reflected by front and back TIR surfaces 55 and 56 represented by light rays 81 and 82.

Figure 3A:
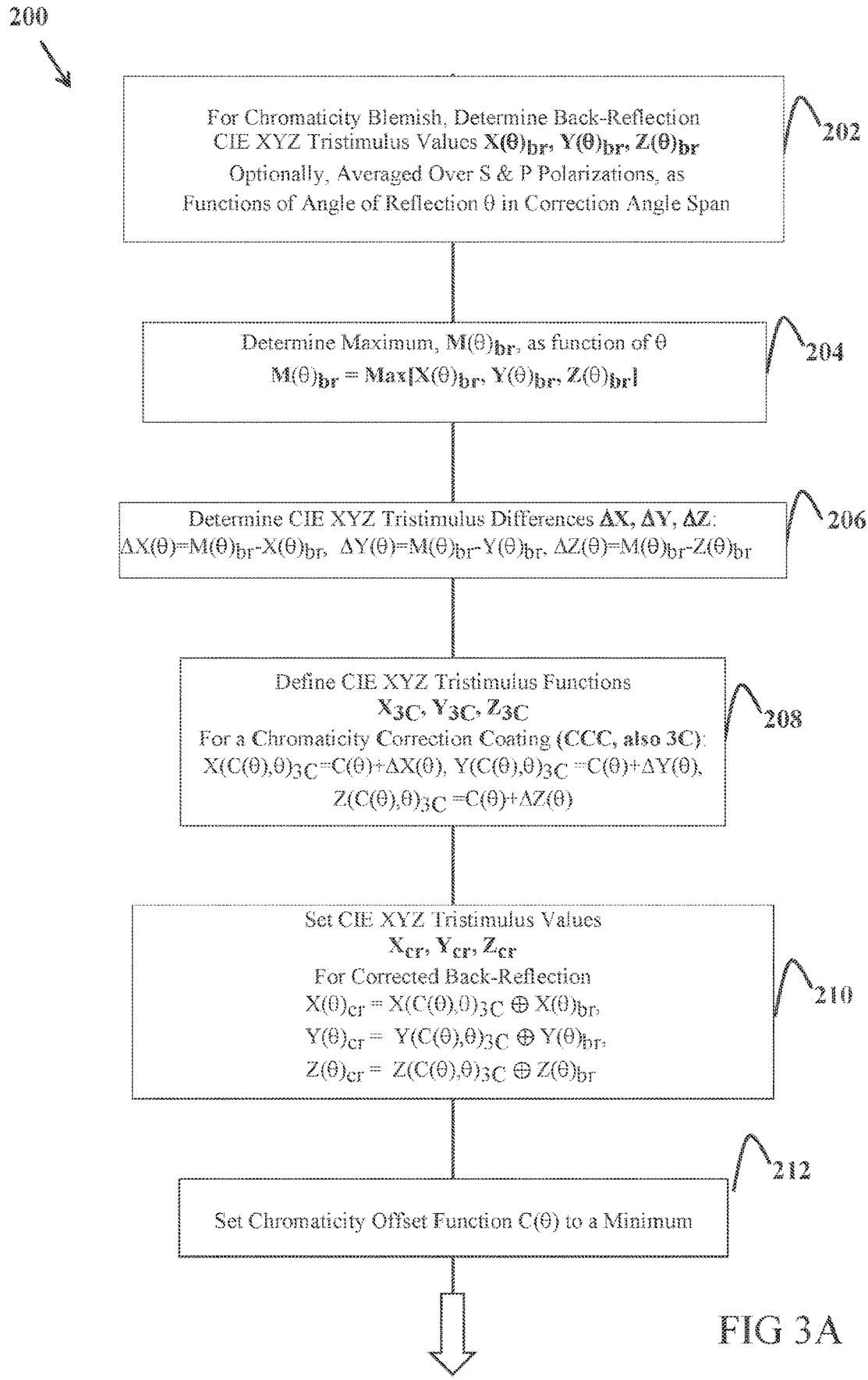
FIGS. 3A and 3C show a flow diagram of a procedure for configuring a CCC to moderate chromatic back-reflectance, in accordance with an embodiment of the disclosure.
Figure 3B:
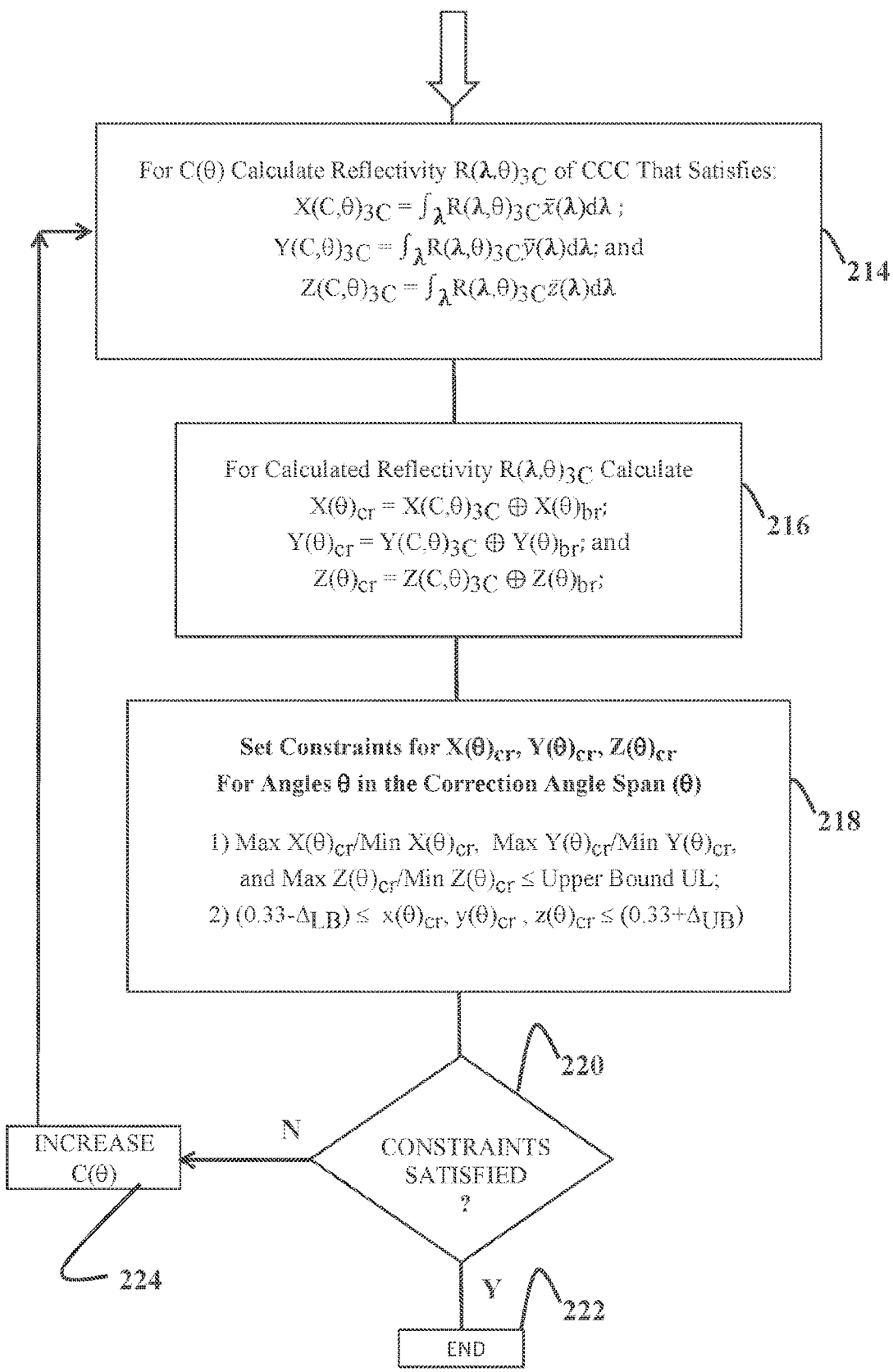

FIGS. 3A-3C illustrate a procedure 200 that may be executed to configure a CCC to moderate chromaticity of a chromaticity blemish generated by a back-reflecting component of an LOE comprised in given pair of AR glasses, in accordance with an embodiment of the disclosure. Values and functions in the following discussion that are associated with the CCC may be indicated by a subscript "3C", the back-reflecting component may be referred to as "BR" and a subscript "br" may be used to indicate functions and values associated with the BR.

In a block 202 procedure 200 determines values for the, optionally CIEXYZ, tristimulus values $X(\theta)_{br}$, $Y(\theta)_{br}$, $Z(\theta)_{br}$ for the chromaticity blemish generated by BR as functions of angle of reflection $\theta$ in a correction span of angles. Optionally, in a block 204 a maximum $M(\theta)_{br}$ as a function of e is determined so that for a given value of $\theta$, $M(\theta)_{br}$ is equal to a maximum of $X(\theta)_{br}$, $Y(\theta)_{br}$, and $Z(\theta)_{br}$, $$M(\theta)_{br} = \text{MAX}[X(\theta)_{br}, Y(\theta)_{br}, Z(\theta)_{br}] \quad (1)$$

In a block 206 the procedure optionally determines CIE tristimulus differences $$\Delta X(\theta) = M(\theta)_{br} - X(\theta)_{br}, \Delta Y(\theta) = M(\theta)_{br} - Y(\theta)_{br}, \text{ and}$$
$$\Delta Z(\theta) = M(\theta)_{br} - Z(\theta)_{br} \quad (2)$$

as functions of $\theta$. Optionally in a block 208 a set of expressions for tristimulus values X3C, Y3C, Z3C of the CCC are defined as:

$$X(C(\theta), \theta)_{3C} = C(\theta) + \Delta X(\theta); Y(C(\theta), \theta)_{3C} = C(\theta) + \Delta Y(\theta);$$
$$Z(C(\theta), \theta)_{3C} = C(\theta) + \Delta Z(\theta). \quad (3)$$

In expression (3) $C(\theta)$ is an arbitrary offset function that is determined as discussed below, optionally by an iterative process, to provide tristimulus values of the CCC that are combinable with the tristimulus values $X(\theta)_{br}$, $Y(\theta)_{br}$, $Z(\theta)_{br}$ of the back-reflecting component to provide advantageous tristimulus values $X(\theta)_{cr}$, $Y(\theta)_{cr}$, and $Z(\theta)_{cr}$ for a corrected back-reflection that moderate chromaticity of the chromaticity blemish, in accordance with an embodiment of the disclosure.

Optionally in a block 210 expressions for the tristimulus values $X(\theta)_{cr}$, $Y(\theta)_{cr}$, and $Z(\theta)cr$ for the corrected back-reflection are defined:

$$\left. \begin{array}{l} X(\theta)_{cr} = X(C(\theta), \theta)_{3C} \oplus X(\theta)_{br}, \\ Y(\theta)_{cr} = Y(C(\theta), \theta)_{3C} \oplus Y(\theta)_{br}, \text{ and} \\ Z(\theta)_{cr} = Z(C(\theta), \theta)_{3C} \oplus Z(\theta)_{br}. \end{array} \right\} \quad (4)$$

where the operator $\oplus$ represents a formula for combining two tristimulus values that the operator conjoins.

To determine $\oplus$ in accordance with an embodiment, assume that the back-reflecting component BR in the AR glasses and CCC formed to moderate the chromaticity of the blemish that the BR generates are one behind the other with CCC in front facing the ambient environment as schematically shown for then CCC 102 and BR 60 shown in FIG. 2A. Let $R(\lambda, \theta)_{3C}$ and $R(\lambda 2, \theta)_{br}$ represent reflectivities of CCC and BR respectively as functions of wavelength $\lambda$ and angle $\theta$. A total back reflectivity, $TBR(\lambda, \theta)$, for the pair CCC and BR as a function of wavelength $\lambda$ and angle $\theta$ may, ignoring absorption in the CCC and BR be written: $TBR(\lambda, \theta) = [(R_{3C} + R_{br} + R_{3C} R_{br}(R_{3C} - 2)]$. (4) Assuming ambient illumination of the AR glasses in a user environment is white then the CIE tristimulus value $X(\theta)_{cr}$, $Y(\theta)_{cr}$ and $Z(\theta)_{cr}$ given in expression (4) for the corrected back reflection may be given by an expression $$\left. \begin{array}{l} X(\theta)_{cr} = \int_\lambda TBR(\lambda, \theta) \bar{x}(\lambda) d\lambda = \int_\lambda [R_{3C} + R_{br} + R_{3C} R_{br}(R_{3C} - 2)] \bar{x}(\lambda) d\lambda \\ = X(\theta)_{3C} + X(\theta)_{br} + \int_\lambda [R_{3C} R_{br}(R_{3C} - 2)] \bar{x}(\lambda) d\lambda; \text{ and similarly} \\ Y(\theta)_{cr} = Y(\theta)_{3C} + Y(\theta)_{br} + \int_\lambda [R_{3C} R_{br}(R_{3C} - 2)] \bar{y}(\lambda) d\lambda; \text{ and} \\ Z(\theta)_{cr} = Z(\theta)_{3C} + Z(\theta)_{br} + \int_\lambda [R_{3C} R_{br}(R_{3C} - 2)] \bar{z}(\lambda) d\lambda; \end{array} \right\} \quad (5)$$

where $\bar{x}(\lambda)$, $\bar{y}(\lambda)$, and $\bar{z}(\lambda)$ are the CIE matching functions.

It is noted that for a case where reflectivities $R(\lambda, \theta)_{3C}$ and $R(\lambda, \theta)_{br}$ are relatively small, the integrals in the expressions for $X(\theta)_{cr}$, $Y(\theta)_{cr}$, and $Z(\theta)_{cr}$, given in (5) may be ignored and the expressions reduce to $$\left.\begin{aligned}X(\theta)_{cr} &= X(\theta)_{3C} + X(\theta)_{br}; \\ Y(\theta)_{cr} &= Y(+\theta)_{3C} + Y(\theta)_{br}; \text{ and} \\ Z(\theta)_{cr} &= Z(+\theta)_{3C} + Z(\theta)_{br}\end{aligned}\right\} \quad (6)$$

Optionally, in a block 212 the chromaticity offset function $C(\theta)$ is set to a minimum, optionally zero, and in a block 214 (FIG. 3B) reflectivity $R(\lambda, \theta)_{3C}$ for the CCC with the set value for $C(\theta)$ is calculated subject to the constraints that, $$\left.\begin{aligned}X(C, \theta)_{3C} &= \int_\lambda R(\lambda, \theta)_{3C}\overline{x}(\lambda)d\lambda; \\ Y(C, \theta)_{3C} &= \int_\lambda R(\lambda, \theta)_{3C}\overline{y}(\lambda)d\lambda; \text{ and} \\ Z(C, \theta)_{3C} &= \int_\lambda R(\lambda, \theta)_{3C}\overline{z}(\lambda)d\lambda\end{aligned}\right\} \quad (7)$$

And optionally in a block 216, the corrected tristimulus values are determined for the CCC reflectivity $R(\lambda, \theta)_{3C}$ determined in block 214:

$$\left.\begin{aligned}X(\theta)_{cr} &= X(C, \theta)_{3C} \oplus X(\theta)_{br}; \\ Y(\theta)_{cr} &= Y(C, \theta)_{3C} \oplus Y(\theta)_{br}; \text{ and} \\ Z(\theta)_{cr} &= Z(C, \theta)_{3C} \oplus X(\theta)_{br};\end{aligned}\right\} \quad (8)$$

In a block 218, a set of constraints may be determined for the corrected tristimulus values $X(\theta)_{cr}$, $Y(\theta)_{cr}$, $Z(\theta)_{cr}$ that provide for light reflected from an area of the chromaticity blemish to be perceived as substantially white. To provide for the perception of whiteness the constraints may require that $$(0.33-\Delta_{LB}) \leq x(\theta)_{cr}, y(\theta)_{cr}, z(\theta)_{cr} \leq (0.33+\Delta_{UB}), \quad (9)$$

In expression (9) x, y, and z are the CIE color space values corresponding to $X(\theta)_{cr}$, $Y(\theta)_{cr}$, $Z(\theta)_{cr}$ normalized to $[X(\theta)_{cr}+Y(\theta)_{cr}+Z(\theta)_{cr}]$ and $\Delta_{LB}$ and $\Delta_{UB}$ are lower bound and upper bound deviations from a nominal value of 0.33 that defines a white point, such as CIE-E, in the CIE color space. By way of numerical example, in an embodiment $\Delta_{LB}$ may be less than 0.05, $\Delta_{UB}$ less than 0.02. In an embodiment, the constraints comprise constraints requiring that ratios of maximum to minimum corrected tristimulus values characterizing the reflected light are less than an upper bound UL. In symbols:

Max $X(\theta)_{cr}$/Min $X(\theta)_{cr}$; Max $Y(\theta)_{cr}$/Min $Y(\theta)_{cr}$; and
    Max $Z(\theta)_{cr}$/Min $Z(\theta)_{cr} \leq UL$. (10)

By way of example in an embodiment UL may be less than or equal to about 1.2, 1.1, or 1.05.

In a decision block 220 the procedure determines if the tristimulus values $X(\theta)_{cr}$, $Y(\theta)_{cr}$, and $Z(\theta)_{cr}$ satisfy the constraints. If the tristimulus values satisfy the constraints the reflectivity $R(\lambda, \theta)_{3C}$ for the CCC determined in block 214 may be considered acceptable for producing and providing the AR glasses with the CCC to moderate the chromaticity of the chromaticity blemish generated by the BR in the glasses and the procedure ends in a block 220. On the other hand, if in block 220 the tristimulus values do not satisfy the constraints, the procedure advances to a block 224 and increases the value of $C(\theta)$. Following the increase, the procedure returns to block 214 to repeat the actions in blocks 214 to 218 to determine if with the increased $C(\theta)$ reflectivity $R(\lambda, \theta)_{3C}$ provides tristimulus values that satisfy the constraints and provide for an acceptable CCC.

Figure 4A:
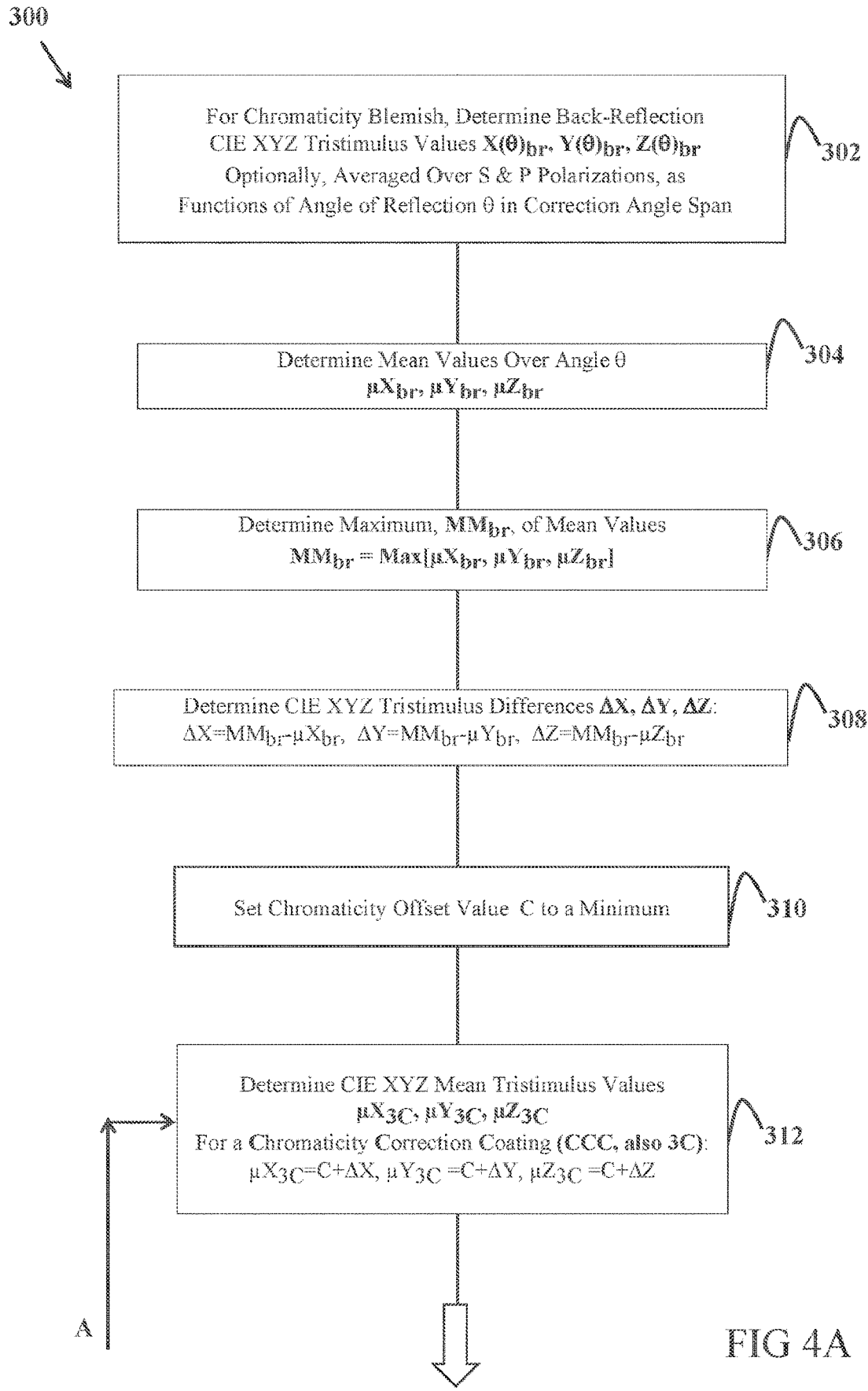
FIGS. 4A and 4B show a flow diagram of another procedure for configuring a CCC to moderate chromatic back reflectance in accordance with an embodiment of the disclosure.
Figure 4B:
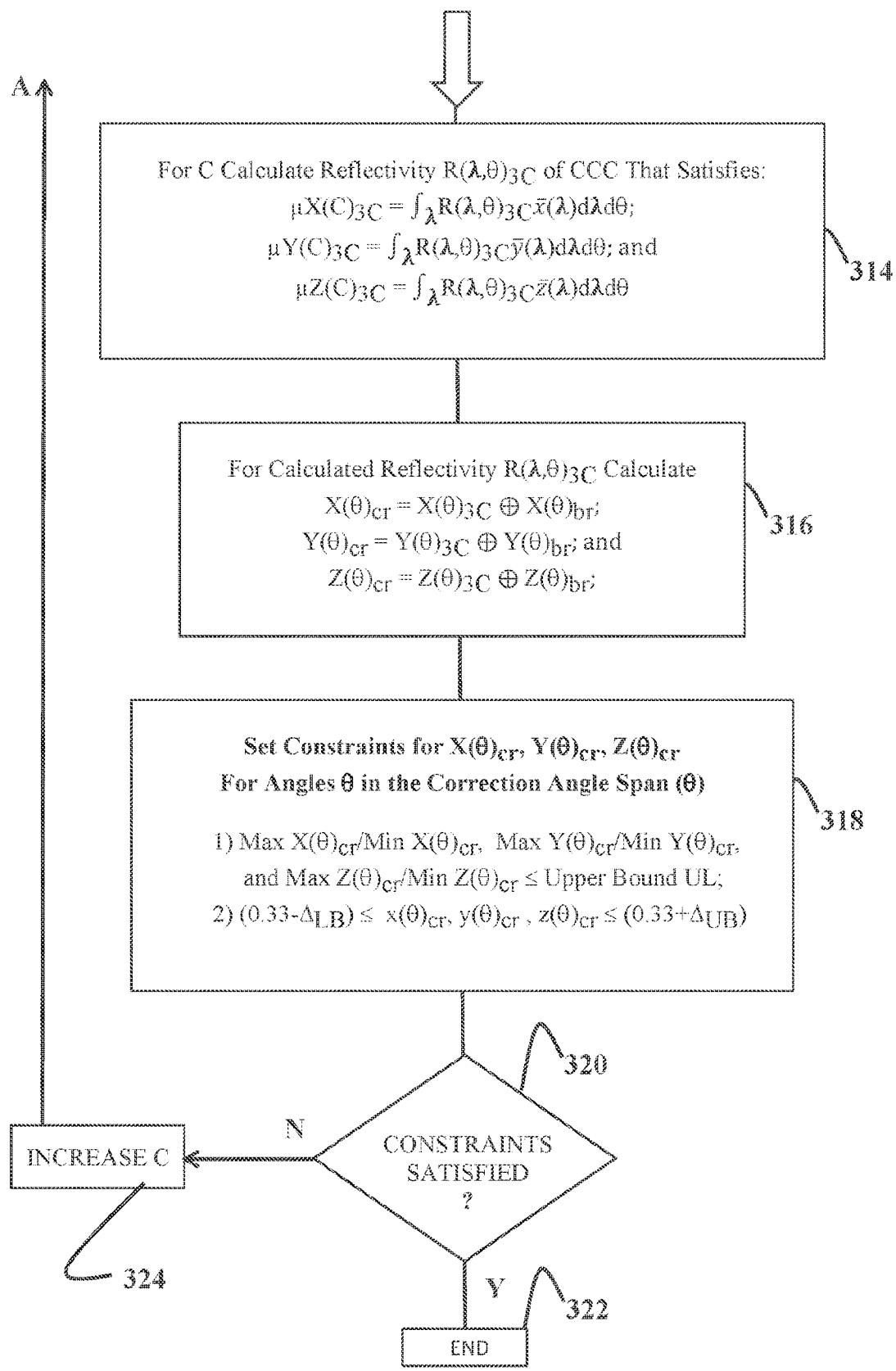

FIGS. 4A and 4B describe a procedure 300 for determining a CCC for a given pair of AR glasses assuming that for angles of incidence within a correction span of angles reflectivity of a BR that generates a chromaticity blemish CIE tristimulus values for light reflected by the CCC from ambient light may be assumed to be substantially independent of angle $\theta$.

In a block 302 procedure 300 determines tristimulus Values $X(\theta)br$, $Y(\theta)br$, $Z(\theta)_{br}$ optionally, averaged over S & P polarizations, as functions of angle of reflection $\theta$ in a correction span of angles for the blemish. In a block 304 the procedure optionally determines mean values $\mu X_{br}$, $\mu Y_{br}$, $\mu Z_{br}$ over angle $\theta$ for $X(\theta)br$, $Y(\theta)_{br}$, $Z(\theta)_{br}$. And in a block 306 optionally determines a maximum $MM_{br}$ of the mean values, $MM_{br}$=Max[$\mu X_{br}$, $\mu Y_{br}$, $\mu Z_{br}$]. Optionally in accordance with an embodiment the procedure may determine in a block 308 tristimulus difference values $\Delta X=MM_{br}-\mu X_{br}$, $\Delta Y=MM_{br}-\mu Y_{br}$, $\Delta Z=MM_{br}-\mu Z_{br}$ and in a block 312 may set achromaticity offset value to a minimum, optionally equal to zero. In a block 312 the procedure calculates mean tristimulus values $\mu X_{3C}$, $\mu Y_{3C}$, $\mu Z_{3C}$ for the CCC: $\mu X_{3C}$=C+$\Delta X$, $\rho Y_{3C}$=C+$\Delta Y$, $\mu Z_{3C}$=C+$\Delta Z$.

In a block 314 (FIG. 4B) reflectivity $R(\Delta, \theta)_{3C}$ for the CCC with the set value for $C(\theta)$ is calculated subject to the constraints that, $$\left.\begin{aligned}\mu X_{3C} &= \int_{\lambda,\theta} R(\lambda, \theta)_{3C}\overline{x}(\lambda)d\theta d\lambda; \\ \mu Y_{3C} &= \int_\lambda R(\lambda, \theta)_{3C}\overline{x}(\lambda)d\theta d\lambda; \text{ and} \\ \mu Z_{3C} &= \int_\lambda R(\lambda, \theta)_{3C}\overline{x}(\lambda)d\theta d\lambda\end{aligned}\right\} \quad (11)$$

and procedure 300 optionally advances to a block 316. In block 316 for the reflectivity $R(\Delta, \theta)_{3C}$ the procedure determines calculates $X(\theta)_{cr}$=$X(\theta)_{3C}\oplus X(\theta)_{br}$; $Y(\theta)_{cr}$=$Y(\theta)_{3C}\oplus Y(\theta)_{br}$; and $Z(\theta)_{cr}$=$Z(\theta)_{3C}\oplus Z(\theta)_{br}$ In a block 318 the procedure determines a set of constraints comprising constraints $(0.33-\Delta_{LB})\leq x(\theta)_{cr}$, $y(\theta)_{cr}$, $z(\theta)_{cr}$ $(0.33+\Delta_{UB})$, and optionally constraints that Max $X(\theta)_{cr}$/Min $X(\theta)_{cr}$, Max $Y(\theta)_{cr}$/Min $Y(\theta)_{cr}$, and Max $Z(\theta)_{cr}$/Min $Z(\theta)_{cr} \leq UL$.

In a decision block 320 the procedure determines if the tristimulus values $X(\theta)_{cr}$, $Y(\theta)_{cr}$, and $Z(\theta)_{cr}$ satisfy the constraints. If the tristimulus values satisfy the constraints reflectivity $R(\Delta, \theta)_{3C}$ determined for the CCC in block 314 may be considered acceptable for producing and providing the AR glasses with the CCC to moderate the chromaticity of the chromaticity blemish generated by the BR in the glasses, and the procedure ends in a block 320. On the other hand, if in block 320 the tristimulus values do not satisfy the constraints, the procedure advances to a block 324 and increases the value of C. Following the increase, the procedure returns to block 312 to repeat the actions in blocks 312 to 318 to determine if with the increased C reflectivity $R(\Delta, \theta)_{3C}$ provides tristimulus values that satisfy the constraints and provide for an acceptable CCC.

Figure 5A:
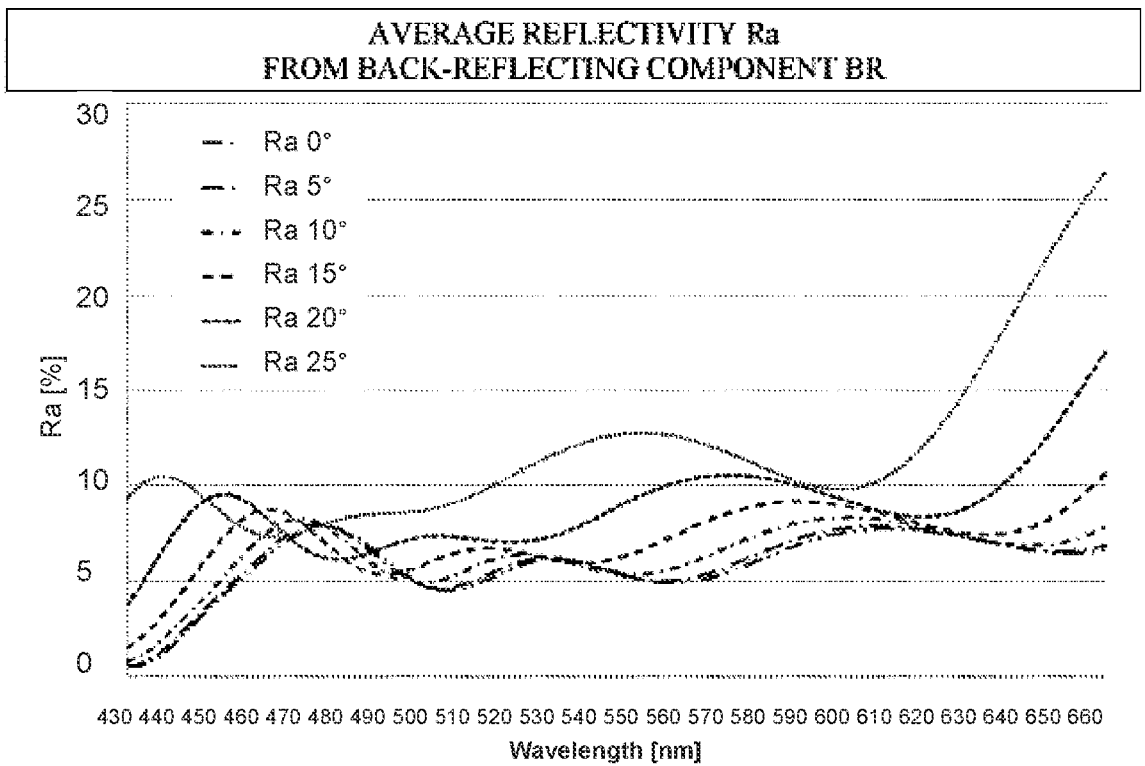
Figure 5B:
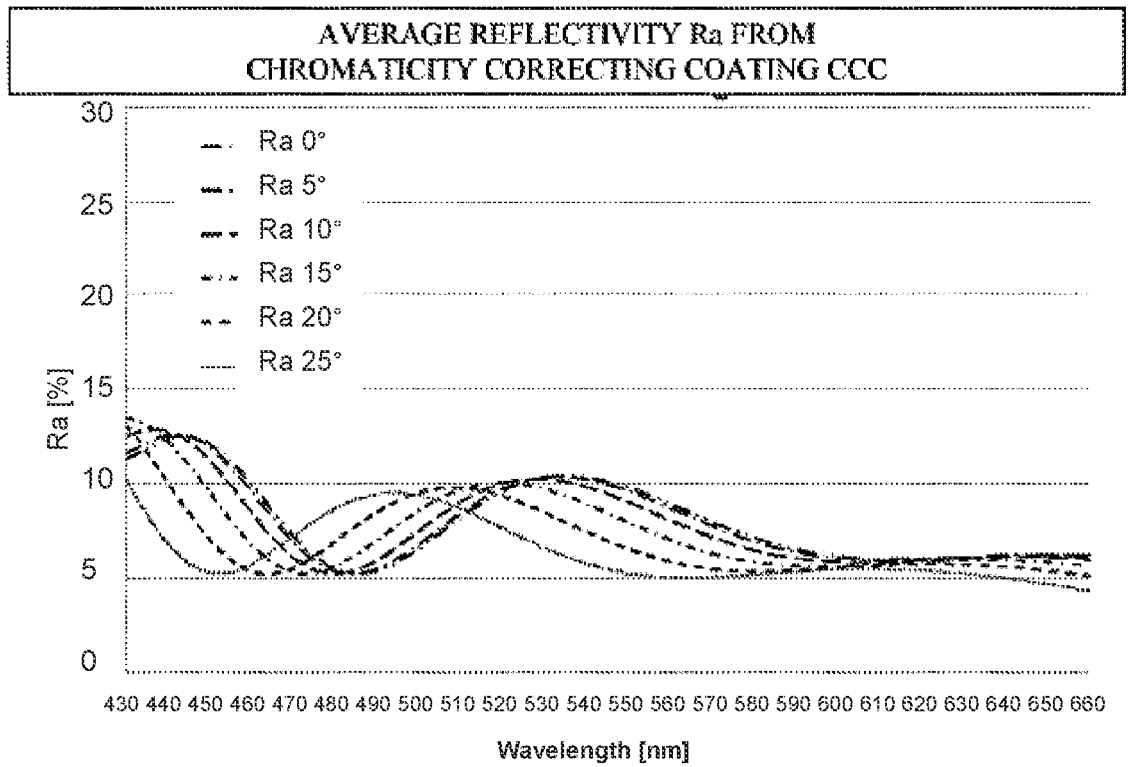
Figure 5C:
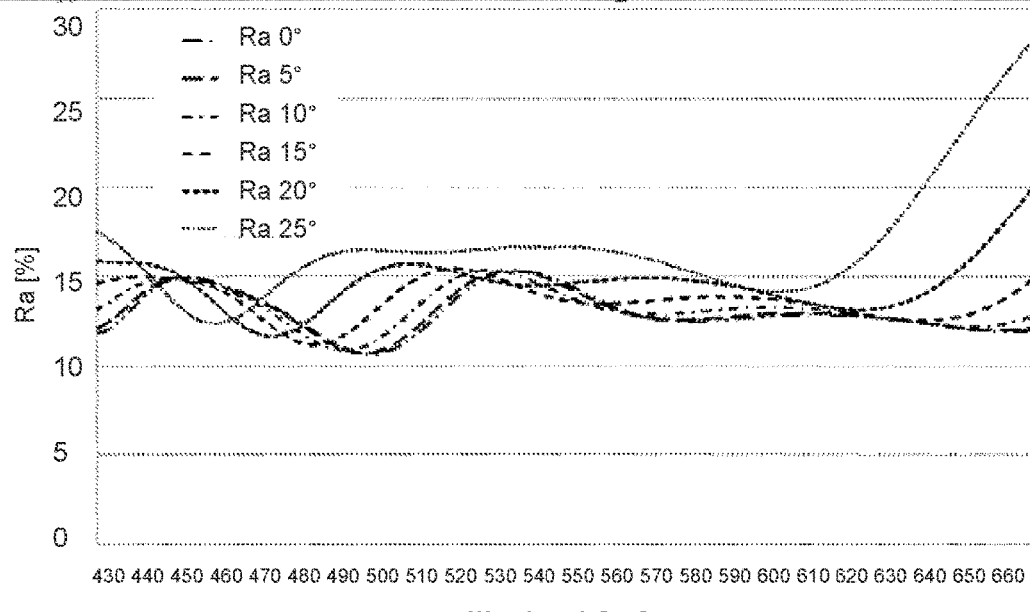
Figure 5D:
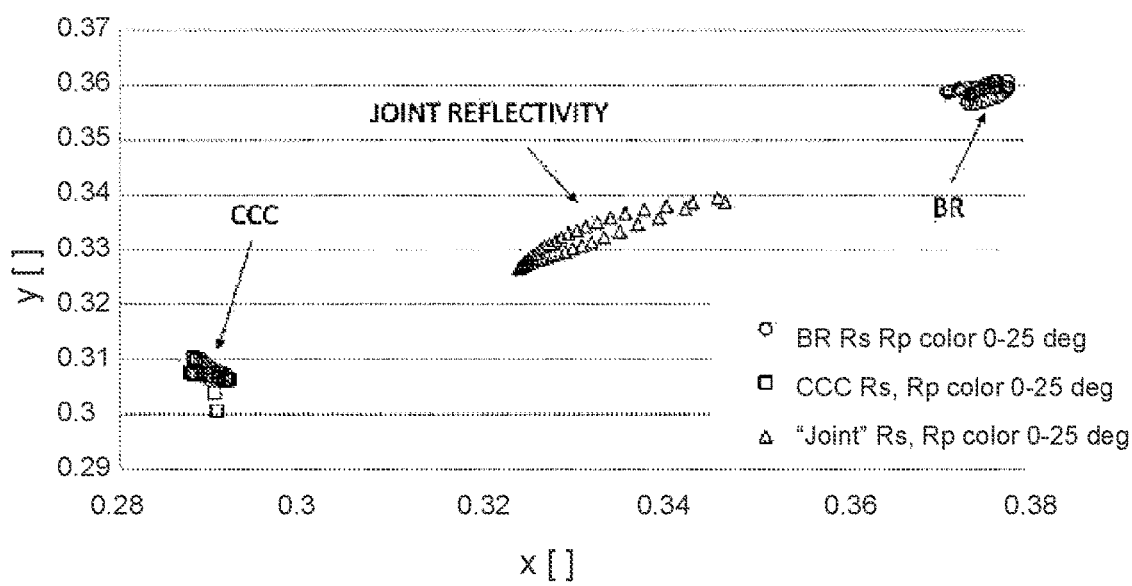

FIGS. 5A-5E show data resulting from an actual implementation of a procedure in accordance with an embodiment similar to procedure 300 to provide a chromaticity correcting coating CCC that operates to correct chromaticity exhibited in a correction span of angles by a chromaticity blemish resulting from a back-reflecting component BR. FIGS. 5A and 5B show graphs for reflectivities, Ra, averaged over S and P polarizations as a function of wavelength and a selection of angles of reflection in a correction span of angles for the BR and CCC respectively. FIG. 5C shows the corrected reflectivity resulting from the reflectivity provided by the CCC complementing the reflectivity of the BR to provide reflected light in the correction span of angles that is perceived substantially as white. FIG. 5D shows color coordinates x, and y characterizing light reflected from various back-reflecting components, BR, chromaticity correcting coatings in accordance with an embodiment of the disclosure, and substantially white light reflected by the BRs and CCC acting jointly. FIG. 5E provides numerical values encountered in generating the CCC for the BR characterized by the graphs shown in FIGS. 5B and 5A respectively, It is noted that whereas in the above description tristimulus values of a CIE color space are used to describe chromaticity of light reflected by a BR and CCC and configure a CCC to modify light back-reflected by the BR, practice of embodiments of the disclosure are not limited to use of CIE color space. Any of various other color spaces, such as by way of example, an HSL (Hue, Saturation, Lightness), HSV (Hue, Saturation, Value), or RGB (Red, Blue, Green) color space may be used to characterize light from a BR, and a CCC, and to configure the CCC.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A method for moderating chromaticity appearance of an augmented reality and/or mixed reality (AR/MR) display system, the chromaticity appearance corresponding to light reflected into an environment by at least one component included in a lens of the (AR/MR) display system through which a user of the (AR/MR) display system views the environment, the method comprising:
   adding a chromaticity corrective coating (CCC) having chromaticity complementary to chromaticity of the at least one component such that light reflected by the at least one component combined with light reflected by the CCC appear homogenic, colorless, or white.

2. The method of claim 1, comprising:
   determining the chromaticity of the CCC by determining a first set of tristimulus values characterizing environment light reflection of the at least one component as a function of an angle of reflection θ in a bounded span of angles of reflection.

3. The method of claim 2, comprising:
   determining a second set of tristimulus values for angles in the bounded span of angles so that light characterized by the second set of tristimulus values combined with light reflected by the at least one component would be perceived substantially as homogenic, colorless, or white light, and
   providing the CCC such that the light reflected by the CCC is substantially characterized by the second set of tristimulus values.

4. The method of claim 3, wherein determining the first set of tristimulus values comprises determining the tristimulus values averaged over S and P polarizations of the reflected ambient light.

5. The method of claim 3, wherein determining the second set of tristimulus values comprises determining mean values for each of the first set of tristimulus values over angle of reflection θ in the bounded span of angles.

6. The method of claim 3, comprising selecting a maximum mean value of the mean values.

7. The method of claim 6, comprising determining a difference between each of the first set of tristimulus values and the maximum mean value.

8. The method of claim 7, comprising adding an offset constant having a minimum value to each of the differences.

9. The method of claim 8, wherein providing the optical coating comprises:
   a) determining a reflectivity as a function of angle of reflection θ for which an average of each tristimulus value over θ determined by the reflectivity is equal to a corresponding tristimulus value in the second set of tristimulus values;
   b) using the reflectivity to determine a third set of tristimulus values characterizing ambient light reflected a coating exhibiting the determined reflectivity and the component as functions of angle of reflection θ;
   c) determining whether light characterized by the third set of tristimulus values would be perceived as white light; and
   d) if the light would not be perceived substantially as white light changing the value of the offset constant and repeating a)-d).

10. The method of claim 9, wherein changing the offset constant comprises increasing the constant.

11. The method of claim 3, wherein determining the second set of tristimulus values comprises determining the values as functions of angle of reflection θ in the bounded span of angles.

12. The method of claim 11, comprising determining a maximum tristimulus function having a value for each angle θ equal to a maximum of the tristimulus values at the angle.

13. The method of claim 12, comprising determining tristimulus differences each difference equal to the maximum tristimulus function minus a different one of the tristimulus values in the set of tristimulus values.

14. The method of claim 13, comprising adding a tristimulus offset as a function of θ to each tristimulus difference.

15. The method of claim 14, wherein providing the optical coating comprises:
   a) determining a reflectivity as a function of angle of reflection θ for which each tristimulus value determined by the reflectivity is equal to a corresponding tristimulus value in the second set of tristimulus values;
   b) using the reflectivity to determine a third set of tristimulus values characterizing ambient light reflected by a coating exhibiting the determined reflectivity and the component as functions of angle of reflection θ;
   c) determining whether light characterized by the third set of tristimulus values would be perceived as white light; and
   d) if the light would not be perceived substantially as white light changing the offset constant and repeating a)-d).

16. The method of claim 15, wherein changing the offset function comprises increasing the function.

17. The method of claim 16, wherein increasing the offset function comprises adding a constant to the offset function.

18. The method of claim 3, wherein ambient light in the environment is substantially white light.

19. The method of claim 3, wherein the lens is a lens of augmented reality (AR) glasses, the lens comprising an image delivery system.

20. The method of claim 3, wherein tristimulus values are tristimulus values of a CIE (Commission Internationale de l'Eclairage) or RGB (Red, Blue, Green) color space.

21. The method of claim 1, wherein the (AR/MR) display system incorporates a light guiding optical element (LOE), the method comprising adding the CCC to a surface of the LOE.

22. The method of claim 1, wherein the (AR/MR) display system incorporates a light guiding optical element (LOE), the method comprising adding the CCC to a surface of the lens of the (AR/MR) display system incorporating the LOE.

23. The method of claim 1, wherein the (AR/MR) display system incorporates a light guiding optical element (LOE) and the LOE incorporates a light mixer, the method comprising adding the CCC or a second CCC to reflect light back into the environment that substantially spatially overlaps light reflected by the mixer.

24. The method of claim 23, comprising adding the CCC or the second CCC to a surface of the LOE or to a surface of the lens of the (AR/MR) display system incorporating the LOE.

25. The method of claim 23, comprising adding the second CCC on or as a part of the CCC.

26. The method of claim 1, wherein the (AR/MR) display system incorporates a light guiding optical element (LOE) and the LOE incorporates a diffraction grating on a surface of the LOE, the method comprising adding the CCC or a second CCC overlapping a region of a surface of the LOE through which light reflected from the diffraction grating exits the LOE into the environment.

27. The method of claim 1, wherein the (AR/MR) display system incorporates a light guiding optical element (LOE) and the LOE incorporates a holographic grating internal to the LOE, the method comprising adding the CCC or a second CCC overlapping a region of a surface of the LOE through which light reflected from the holographic grating exits the LOE into the environment.

28. An augmented reality and/or mixed reality (AR/MR) display system having a moderated chromaticity appearance to an environment, comprising:

a light guide optical element (LOE) disposed in a lens of the system through which a user wearing the system views the environment, the LOE including at least one component that reflects light into the environment;

a chromaticity corrective coating (CCC) having chromaticity complementary to chromaticity of environment light reflection of the at least one component such that light reflected by the at least one component combined with light reflected by the CCC appear homogenic, colorless, or white to the environment.

29. The AR/MR display system of claim 28, wherein the chromaticity of the environment light reflection of the at least one component corresponds to a first set of tristimulus values characterizing environment light reflection of the at least one component as a function of an angle of reflection θ in a bounded span of angles of reflection.

30. The AR/MR display system of claim 29, wherein chromaticity of the CCC corresponds to a second set of tristimulus values for angles in the bounded span of angles so that light characterized by the second set of tristimulus values combined with light reflected by the at least one component is perceived substantially as homogenic, colorless, or white light.

31. The AR/MR display system of claim 28, where the CCC is disposed on a surface of the LOE.

32. The AR/MR display system of claim 28, wherein the CCC is disposed on a surface of the lens of the AR/MR display system.

33. The AR/MR display system of claim 28, wherein the LOE incorporates a light mixer and the CCC or a second CCC is disposed in the lens to reflect light back into the environment that substantially spatially overlaps light reflected by the mixer.

34. The AR/MR display system of claim 33, wherein the CCC or the second CCC is disposed on a surface of the LOE or on a surface of the lens of the AR/MR display system.

35. The AR/MR display system of claim 33, wherein the second CCC is disposed on or as a part of the CCC.

36. The AR/MR display system of claim 28, wherein the LOE incorporates a diffraction grating on a surface of the LOE and the CCC or a second CCC overlaps a region of a surface of the LOE through which light reflected from the diffraction grating exits the LOE into the environment.

37. The AR/MR display system of claim 28, wherein the LOE incorporates a holographic grating internal to the LOE and the CCC or a second CCC overlaps a region of a surface of the LOE through which light reflected from the holographic grating exits the LOE into the environment.

* * * * *